Inventor:
Frank M. Clark,
by Charles A. Mueller
His Attorney.

May 19, 1936.   F. M. CLARK   2,041,594
ELECTRICAL CAPACITOR
Filed Aug. 6, 1931   3 Sheets-Sheet 2

Inventor:
Frank M. Clark,
by *Charles V. Tullar*
His Attorney.

May 19, 1936.　　　F. M. CLARK　　　2,041,594
ELECTRICAL CAPACITOR
Filed Aug. 6, 1931　　　3 Sheets-Sheet 3

Inventor:
Frank M. Clark,
by Harry E. Dunham
His Attorney.

Patented May 19, 1936

2,041,594

UNITED STATES PATENT OFFICE 2,041,594

ELECTRICAL CAPACITOR

Frank M. Clark, Pittsfield, Mass., assignor to General Electric Company, a corporation of New York Application August 6, 1931, Serial No. 555,570

15 Claims. (Cl. 175—41)

The present invention relates to electrical condensers or capacitors, including capacitance bushings, and the like, in which the dielectric constant, power factor and other electrical properties of the dielectric medium are important factors in determining the efficiency and characteristics of the device.

In such capacitance devices a liquid dielectric has certain marked advantages over a solid dielectric as it is less susceptible to the formation of voids and more efficiently dissipates heat due to electrical losses.

Heretofore, mineral oil has been commonly used when a liquid medium was desired for this purpose. Mineral oil, however, has a relatively low dielectric constant. Some properties of mineral oil, such as its inflammability during use, constitute serious disadvantages.

In accordance with my present invention marked improvements are obtained in capacity devices by employing as a dielectric medium a suitable halogenated diaryl compound, as for example, chlorinated diphenyl, chlorinated diphenyl oxide, or chlorinated diphenyl substitution products, such as chlorinated diphenyl benzene, or mixtures of such diaryl compound with one another, or with some other compound as, for example, a mixture of chlor diphenyl and trichlor benzene.

In addition to such properties which render halogenated polyphenyl compounds advantageous in various electrical devices, as for example, their high electrical resistance, their substantially noninflammable nature, their specific gravity, which is greater than water, and their property of remaining liquid at relatively low temperatures, suitably chosen halogenated polyphenyl compounds exhibit certain extraordinary properties, such as high specific inductive capacity and low power factor which render their use particularly advantageous as dielectric media for capacitors. The isomerism exhibited by such compounds promotes the possibility of cryohydric mixtures of isomers being formed which will remain liquid at low temperatures.

The present application is a continuation in part of my prior applications Serial No. 425,358, filed February 1, 1930, and Serial No. 527,204, filed April 2, 1931. As a result of the latter application United States Patent 1,931,455 has been issued on October 17, 1933.

Figure 1:
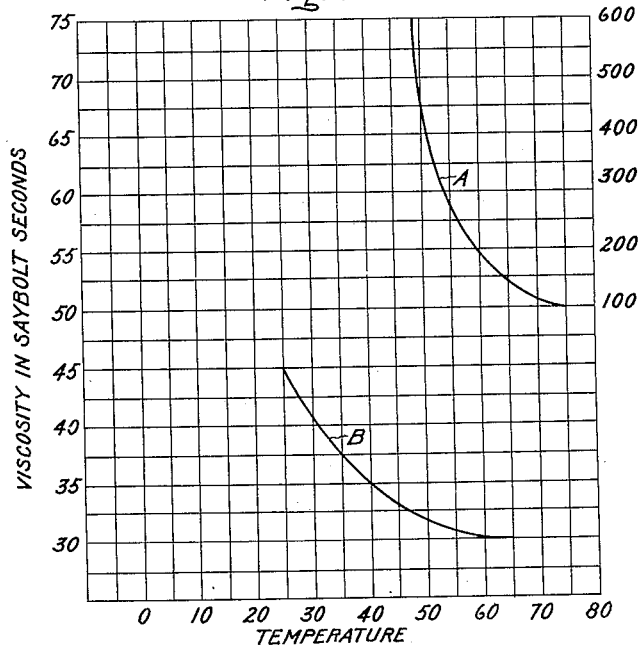
Figure 2:
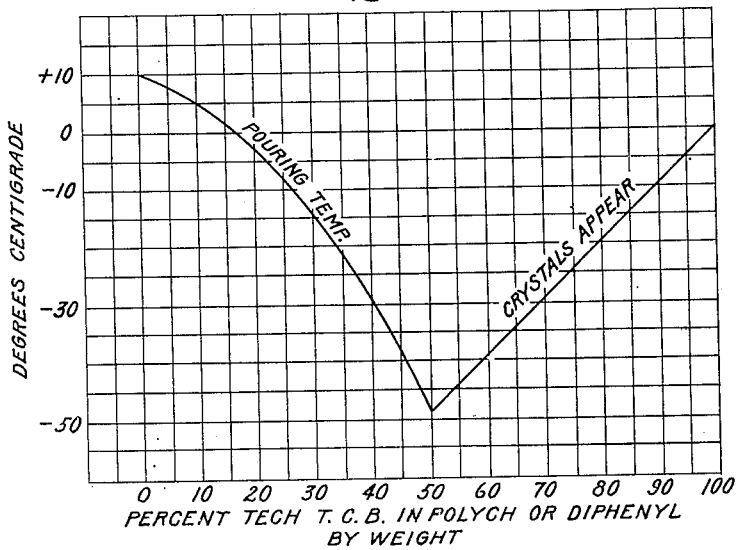
Figure 3:
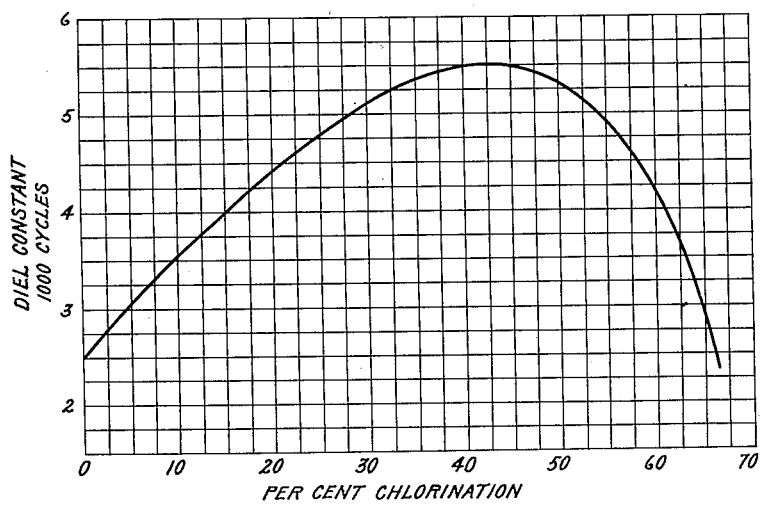
Figure 4:
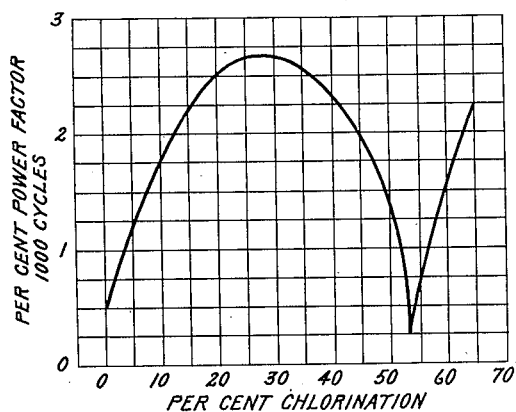
Figure 5:
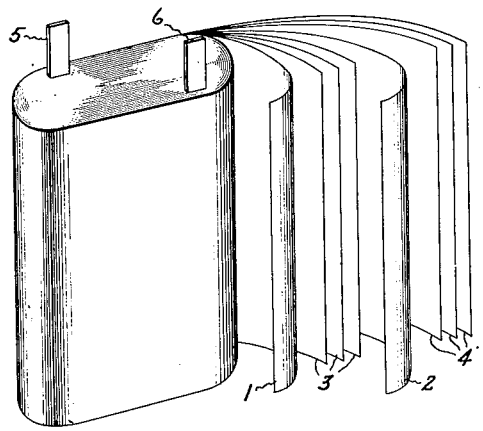
Figure 6:
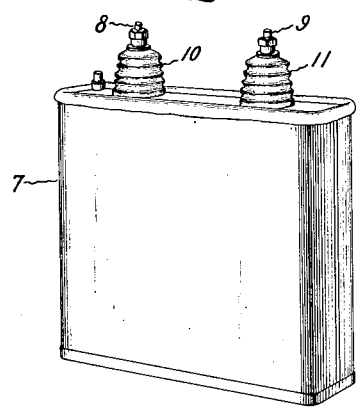

In the accompanying drawings Fig. 1 is a graph indicating the viscosity in Saybolt units respectively of a chlorinated diphenyl and a mixture of chlorinated diphenyl and trichlor benzene; Fig. 2 is a graph indicating the temperatures at which various proportions of such a mixture cease to flow or to show crystal formation; Fig. 3 indicates the dielectric constant of a range of chlorinated diphenyl compounds; Fig. 4 is a similar graph indicating the power factor of such a range; Fig. 5 is a side elevation of a rolled type capacitor assembly (shown partly unrolled); and Fig. 6 is a side elevation of an encased capacitor.

Chlorination of diphenyl and its substitution products may be carried out by known methods. In accordance with one method diphenyl may be caused to react with chlorine gas in the presence of a catalyzer, such as iron. For capacitor dielectric use I may employ a material having a chlorine content of about 25 to 60%, the choice of chlorine content depending on factors hereinafter explained. This material may be obtained by purifying the chlorination product, free hydrochloric acid and chlorine being removed therefrom. For example, the impure product may be washed with an aqueous, caustic solution and then vacuum distilled. The chlorination should be carried out in such a way that the chlorinated product is a liquid consisting of a mixture of chlorinated diphenyl compounds.

I prefer for most capacitor purposes to use a chlorination product containing about 54% chlorine, which is the theoretical proportion of chlorine in pentachlor diphenyl, although the mixture employed may contain some lower and some higher chlorination products. While a diphenyl chlorination product which contains about 54% chlorine may be termed a pentachlor diphenyl, as ordinarily produced without especial purification, it consists of a mixture of the various isomers of pentachlor diphenyl. This is an advantage as such a mixture remains liquid at a lower temperature than a material consisting of a single isomer. For some purposes the most favorable percentage of 54% may be departed from somewhat, 50 to 60 per cent of chlorine however being the preferred range. This material has a viscosity temperature relation as indicated by curve A, Fig. 1, in which the viscosities in "Seconds Saybolt universal" are plotted as ordinates and the temperatures in degrees centigrade are plotted as abscissae. The ordinates for curve A are indicated at the right-hand scale of the diagram. The mixture becomes too viscous for pouring between about 0° C. and +10° C., depending on the exact chemical composition.

The purified material has a dielectric constant at room temperature of about 5. The resistance of the material at 100° C. when free from contamination is about 1 x 10$^{12}$ ohms per centimeter cube or higher. Its power factor at room temperature is about .05%. The power factor will be referred to again in connection with Fig. 4.

As an example of carrying out my invention I shall refer to electrical capacitors or condensers, such as shown, for example, in Figs. 5 and 6, containing aluminum electrodes 1 and 2 (Fig. 5) and interposed layers 3 and 4 of fibrous dielectric, for example, two or three sheets of paper, each of 0.0004" thickness. Strip terminals 5, 5 are connected to the respective electrodes 1, 2. Such capacitors are impregnated with liquid chlorinated diphenyl by first thoroughly drying the paper in the assembled capacitor, preferably in a vacuum, and then admitting to the dried capacitor in a vacuum the desired impregnating mixture. The capacitors also may be impregnated by immersing the capacitors even without previous drying in the chlorinated diphenyl composition which is heated to a temperature of about 150° C. to 160° C. The capacitors (immersed in the treating liquid) may then be soldered in a liquid tight case 7 (Fig. 6), or after draining, the capacitors may be sealed to exclude air and then are ready for use. External terminals 8, 9 insulated from the case 7 by the insulators 10, 11 are provided.

For some purposes of my invention, I may employ a mixture of pentachlor diphenyl and trichlor benzene, preferably in substantially equal proportions by weight. The viscosity of such a mixture is materially lower than that of pentachlor diphenyl as shown by curve B of Fig. 1, the ordinates of which are indicated at the left-hand scale.

I have found that such a mixture possesses the properties of a super-cooled liquid which is still capable of being poured at a temperature as low as −48° C. The mixture will remain non-crystalline at temperatures down to approximately −70° C. The graph shown in Fig. 2 illustrates the minimum pouring temperature and the maximum temperature at which crystals appear as a function of the ratio of the above two compounds.

In determining the minimum pouring temperature or the temperature at which crystals appear, about 45 c. c. of the liquid may be placed in a bottle 1⅜ inches in diameter and approximately 3 inches tall. With a thermometer held in place by a close fitting stopper, the mixture then is cooled by suitable means with careful observation until crystallization is noticed or until on being held horizontally the mixture will no longer flow.

The dielectric constant of a mixture of a pentachlor diphenyl and trichlor benzene regardless of proportion is about 5. Such a high constant produces a better equalization of electric strains in electric devices than does mineral oil, with its dielectric constant of about 2.25. Electrical creepage tests show the mixture to be substantially twice as good an insulator as mineral oil, also regardless of proportions. It has a lower affinity for water than mineral oil. An emulsion of water in a mixture of equal parts of pentachlor diphenyl and trichlor benzene becomes demulsified in 60 seconds to the extent of about 90%.

All such mixtures have a materially lower solubility for air, or other gas, than mineral oil. As compared with mineral oil, the improvements in the case of the equal parts mixture is about 60%.

Electrical apparatus features of invention related to the present invention and also compositions suitable for dielectric use in capacitors are described and claimed in my prior Patents 1,931,373 and 1,931,455, issued October 17, 1933.

While for most purposes of my invention a mixture of isomers of chlorinated diaryl and in particular a mixture of isomers of pentachlor diphenyl is preferred, as already indicated above such a dielectric material may contain also associated therewith some compounds of lower and of higher chlorine content as for example some tetrachlor and some hexachlor. In fact, in some cases suitable mixtures of compounds, such as hexachlor diphenyl and tetrachlor diphenyl may be employed.

Many of the benefits of my invention may be obtained by employing other halogenated polyphenyl products. I may employ halogenated derivatives of diphenyl as for example halogenated diphenyl oxide, or halogenated diphenyl benzene. When halogenated dihpenyl oxide is employed I prefer to use halogenated diphenyl oxide, or a mixture of such compounds, containing more than 40% of chlorine. This insures a product with substantially non-burning characteristics. Consistent with physical characteristics I prefer to use a chlorine content between 40 and 51%, the higher dielectric constant accompanying a greater chlorine content within this range. Halogenated diphenyl oxide may be used either alone or in combination with other halogenated products, such as trichlor benzene, or chlorinated diphenyl. In an application, Serial No. 73,595, filed April 9, 1936, as a continuation-in-part of the present application, I have made claims to liquid chlorinated diphenyl oxide compositions containing at least about 40 per cent chlorine and to a method of making such compositions.

In some cases I may employ as a dielectric a mixture of mineral oil and halogenated diaryl, various examples of which have been described above. This is especially advantageous in such cases where a lower dielectric constant than 5 is desired. A dielectric constant of 3.5 may be obtained by using a mixture of about 50 parts of mineral oil and 50 parts of pentachlor diphenyl. Various features of invention involving mineral oil and chlorinated diphenyl are described in my pending application Serial No. 656,142, filed February 10, 1933.

While the previous examples describe mainly dielectric media consisting of chlorinated products other halogenated products may be used as for example fluorine, bromine, or iodine derivatives.

The benefits or advantages of my invention will be apparent from the following comparative figures.

A paper insulated capacitor having cubical dimensions of 3½" x 4¼" x 5" has when impregnated with mineral oil a capacitance of 18 microfarads. When such a capacitor is impregnated with a liquid chlor-diphenyl mixture of 54% chlorine content its capacity is found to have been increased to about 28 to 29 microfarads, which is an increase of about 55 to 60%.

Of course, if no increase of dielectric capacity is desired, the size of the capacitor may be reduced when impregnated with chlor-diphenyl. For example, a one microfarad capacitor when oil treated has a cubical dimension of 4.1 cu. in. When impregnated with chlor-diphenyl a one microfarad capacitor need have a size of only 2.6 cu. in.

As shown in Fig. 4, pentachlor diphenyl, as a mixture of its isomers, is particularly well suited for use as a dielectric in capacitors because of its low power factor. In this figure the power factor (dielectric energy loss) of diphenyl and its chlorinated products is indicated for different degrees of chlorination, the ordinates being power factor for 1000 cycles and the abscissae representing diphenyl and chlorination products up to about 65 per cent chlorine content. At about 54% chlorine content the power factor of the chlorination products is a minimum. This percentage of chlorine corresponds to the pentachlor diphenyl. As a dielectric component in capacitors the pentachlor diphenyl hence will have a minimum of power losses for alternating current use. Capacitors containing paper dielectric impregnated with pentachlor diphenyl are characterized by a power factor less than 0.25 per cent.

As shown in Fig. 3, this lower power factor is obtained with but little sacrifice of dielectric constant. Fig. 3 indicates the dielectric constant plotted as ordinates, as a function of degree of chlorination plotted as abscissae. The dielectric constant is near its maximum at about 40 to 45% chlorine content. A pentachlor content of about 54% has dielectric constant within ten per cent of the maximum. For direct current application or use capacitors containing chlor diphenyl having a chlorine content which results in a maximum dielectric constant may be preferred.

The improvements in capacitors effected by using chlorinated diphenyl as a dielectric not only improves the usefulness of capacitors in their present fields of application but renders practicable the commercial operation of capacitors with certain types of electric motors. For example, with a high torque alternating current motor, it is highly desirable to employ a high capacitance to assist in the starting of the motor. For use with 220 and 440 volt motors of this type capacitors containing chlorinated diphenyl as a dielectric are particularly suitable because of their relatively low cost and small bulk. Such capacitors, of course, are also suitable for use in various other power fields, in the radio field, and in general with obvious advantages in other fields of application in which capacitors are employed.

What I claim as new and desire to secure by Letters Patent of the United States, is:

1. A condenser for electrical purposes comprising metal plates separated by fibrous insulating materials impregnated with chlorinated diphenyl.

2. As a new article of manufacture, an electrical condenser having a dielectric of chlorinated diphenyl.

3. An electric capacitor having a dielectric comprising in part at least a liquid halogenated diaryl.

4. As a new article of manufacture, an electrical capacitor having a dielectric comprising a chlorinated diphenyl, the chlorine content of which falls within a range of about 25 to 60 per cent.

5. As a new article of manufacture, an electrical capacitor having a dielectric comprising a chlorinated diphenyl, the chlorine content of which falls within a range of about 50 to 60 per cent.

6. As a new article of manufacture, an electrical capacitor having a dielectric comprising a chlorinated diphenyl, the chlorine content of which is about 54 per cent.

7. As a new article of manufacture, an electrical condenser having a dielectric of chlorinated diphenyl oxide.

8. As a new article of manufacture, an electrical condenser having a dielectric of chlorinated diphenyl benzene.

9. An electric capacitor containing a dielectric material which is liquid at room temperatures and which comprises in part at least halogenated diphenyl, having a sufficiently high halogen content to be substantially non-inflammable.

10. An electric capacitor containing a dielectric material which is liquid at room temperatures and which comprises in part at least a mixture of chlor diphenyl isomers containing about 50 to 60 per cent chlorine.

11. An electric capacitor provided with a dielectric medium comprising in part at least a liquid diphenyl halogen substitution product.

12. An electric capacitor provided with a dielectric medium comprising in part at least a liquid chlor-diphenyl.

13. An electric capacitor having plates, paper interposed therebetween and an impregnant therefor comprising liquid chlor-diphenyl.

14. An electric capacitor provided with a dielectric medium comprising in part at least a liquid halogenated polyphenyl compound.

15. A liquid dielectric for electrical devices consisting of chlorinated diphenyl oxide.

FRANK M. CLARK.